United States Patent [19]

Sullivan

[11] Patent Number: 5,375,184
[45] Date of Patent: Dec. 20, 1994

[54] FLEXIBLE CHANNEL OPTICAL WAVEGUIDE HAVING SELF-ALIGNED PORTS FOR INTERCONNECTING OPTICAL DEVICES

[75] Inventor: Charles T. Sullivan, Burnsville, Minn.
[73] Assignee: Honeywell Inc., Minneapolis, Minn.
[21] Appl. No.: 998,319
[22] Filed: Dec. 29, 1992
[51] Int. Cl.$^5$ .............................................. G02B 6/10
[52] U.S. Cl. .................................................. 385/129
[58] Field of Search ............................... 385/129-132

[56] References Cited

U.S. PATENT DOCUMENTS

| | | | |
|---|---|---|---|
| 4,092,061 | 5/1978 | Stigliani, Jr. | 385/31 |
| 4,952,016 | 8/1990 | Adams et al. | 385/131 |
| 5,018,809 | 5/1991 | Shin et al. | 385/130 |
| 5,048,907 | 9/1991 | Wickman et al. | 385/130 X |
| 5,122,852 | 6/1992 | Chan et al. | 357/30 |
| 5,123,078 | 6/1992 | Thomas | 385/129 X |
| 5,125,054 | 6/1992 | Ackley et al. | 385/49 |
| 5,157,748 | 10/1992 | Mueller et al. | 385/131 X |
| 5,249,245 | 9/1993 | Lebby et al. | 385/132 X |
| 5,253,311 | 10/1993 | Killen et al. | 385/129 X |

FOREIGN PATENT DOCUMENTS 0391248 10/1990 European Pat. Off. .
63-28020 3/1989 Japan .
9200538 1/1992 WIPO .

OTHER PUBLICATIONS

Havant GB, "Flexible Interposing Carrier Scheme for Optical Waveguides," Jul. 1989, *Research Disclosure*, No. 303, p. 512.
Mir Akbar Ali, "New Materials & Design Components for Integrated Optics," Aug. 1985, *Laser Focus World* (Tulsa, U.S.) pp. 48, 50.
M. S. Cohen et al., "Passive Laser-Fiber Alignment by Index Method," Dec. 1991, *IEEE Photonics Technology Letters*, vol. 3, No. 11, pp. 985-987.
J. L. Plawsky et al., "Photochemically Machined, Glass Ceramic, Optical Fiber Interconnection Components", 1988, *Optoelectronic Materials, Devices, Packaging, and Interconnects*, SPIE vol. 994, pp. 101-106.
C. Sullivan, "Optical Waveguide Circuits for Printed Wire–Board Interconnections", 1988, in *Optoelectronic Materials, Devices, Packaging, and Interconnects II*, pp. 92 et seq.
C. Sullivan, et al. "Polymeric Waveguides", Jan. 1992, in *Circuits and Devices* of IEEE (8755-3996/92), pp. 27-31.

*Primary Examiner*—Akm E. Ullah
*Attorney, Agent, or Firm*—John G. Shudy, Jr.

[57] ABSTRACT

A flexible optical coupler for coupling light signals from an optical waveguide on a circuit board or substrate to an optical waveguide on another circuit board or substrate, or to an optical port on an electronic, optoelectronic or photonic integrated circuit. The coupler is self-aligning by virtue of the design of the alignment stops fabricated in close proximity to the optical waveguide or optical port. The coupler may consist of an array of optical waveguides between an array of optical ports and another array of optical ports. The coupler may be used with any substrates appropriate for polymeric waveguide fabrication, including many circuit board materials. The optical waveguide of the coupler is on a flexible and transparent substrate. The coupler is effective for optical connections between devices situated on noncoincident surfaces. Alignment stops are utilized for the case of aligning the ports of the optical coupler to other ports. Alignment stop fabrication is not restricted to crystallographic etch processes.

3 Claims, 6 Drawing Sheets

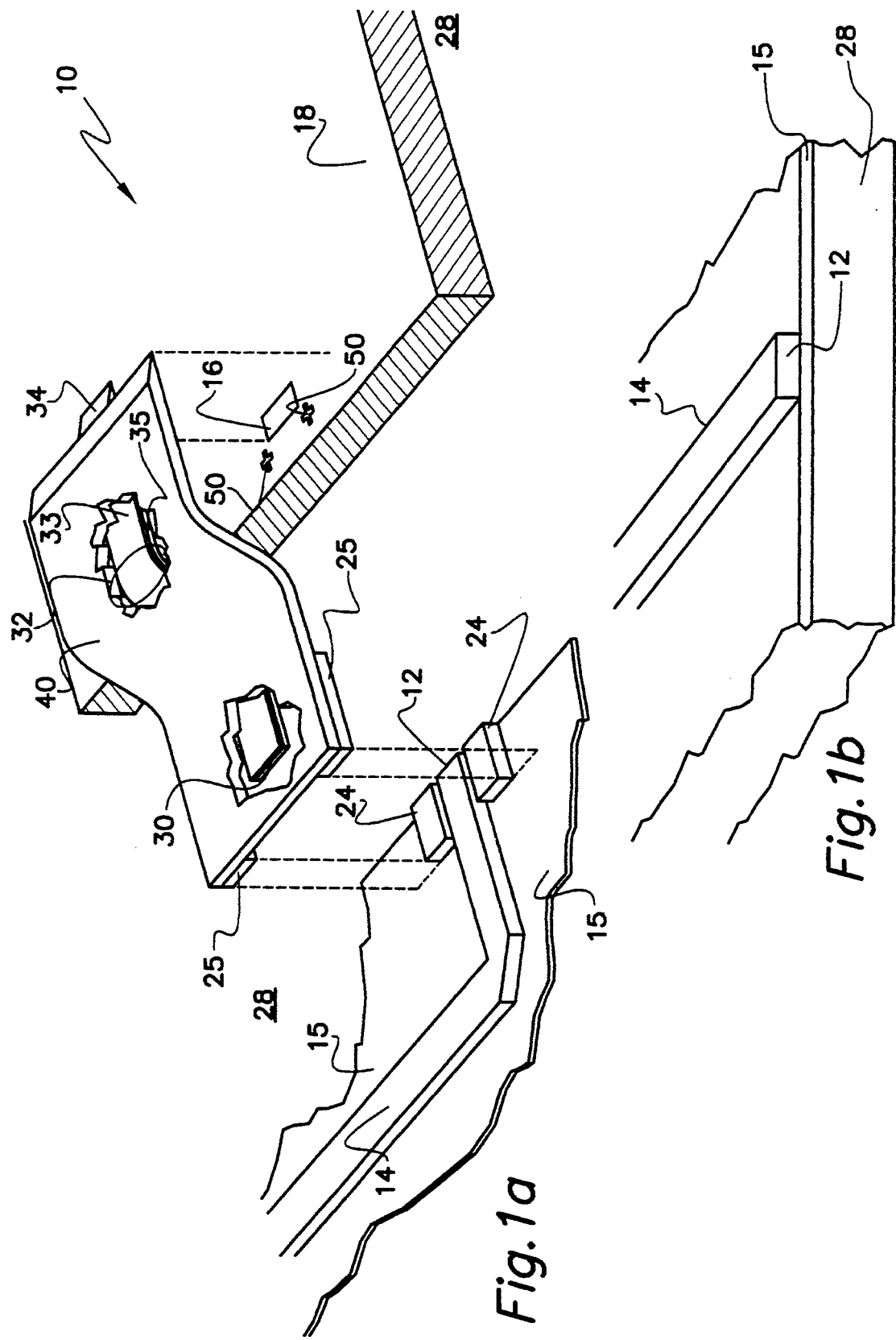

FLEXIBLE CHANNEL OPTICAL WAVEGUIDE HAVING SELF-ALIGNED PORTS FOR INTERCONNECTING OPTICAL DEVICES

BACKGROUND OF THE INVENTION

The present invention pertains to optical couplers and particularly to couplers for coupling light from an optical waveguide on a board or substrate to an optical port on an integrated circuit.

Coupling light from an optical waveguide on a planar printed circuit board or chip substrate via a mount to an optical port on an electronic, opto-electronic or photonic integrated circuit is very difficult to achieve, in the related art, if such coupling is to have high throughput efficiency, tolerance to variations in temperature and wavelength, robustness, and low assembly and maintenance cost.

SUMMARY OF THE INVENTION

The present invention is a flexible waveguide having ports on each end that are self-aligning with respect to the ports that they are connected to. The invention eliminates the problems associated with coupling light from an optical channel waveguide on a planar surface to an optical port on another surface noncoincident with the first surface. With the invention, a light signal is coupled from an optical channel waveguide, preferably in the form of a rectangular polymeric channel waveguide, to an optical port on an electronic, opto-electronic or photonic integrated circuit which is situated in a different plane than the optical waveguide. The optical coupler is functionally equivalent to an optical analog of the electrical "wire bond" or "tape-automated bond" (TAB) which is used to connect two, possibly dissimilar, surfaces or contacts together, particularly between the bonding pads on an integrated circuit and its mount. This invention is intended to exhibit all the desirable features of these electrical devices in that it provides an interconnect "bridge" between two or more noncritically oriented ports, although each end of the coupler is well aligned to each port. The approach of the present invention is self-aligning and easy to implement, and is particularly useful for coupling an array of optical waveguides to an array of optical ports on an electronic, opto-electronic or photonic integrated circuit (similar to the electrical TAB). Only two optical waveguide ports need to be aligned on each end of the optical coupler to ensure that all optical ports on that end are aligned. This approach can be used with edge-emitting or surface-emitting diode lasers or light-emitting diodes, or edge-coupled or surface-coupled photodetectors, optical waveguides and waveguide devices, including modulators and switches. The invention also can be used for coupling optical waveguides on dissimilar substrates (such as between an integrated circuit mount and a printed circuit board), which also may be located in different planes, even orthogonal to each other.

Advantages of the present invention are that the machining/etching of a waveguide substrate is not necessary to access a waveguide end-face or port; although, such machining/etching may be required on the electronic chip. This provides for a relatively noninvasive surface/substrate mount. Preparation of the waveguide end-face can be carried out during the channel delineation process step. This results in the avoidance of extra process steps and mask registration limitations, except on the electronic chip. Further, the alignment stop fabrication can be carried out during the channel delineation process step. The alignment stop fabrication step is not dependent on crystallographic etch processes that are often used on silicon or gallium arsenide substrates. That means extra process steps and mask registration limitations are avoided, as are the orientation constraints associated with the crystallographic etch process. This makes the approach self-aligning and not dependent on crystalline substrates. Such advantages may not exist on the electronic chip unless the optical port on said chip is a polymeric waveguide similar to that on the planar printed circuit board or other integrated circuit substrate. The present invention can be used with any substrates suitable for polymeric waveguide fabrication, including many printed circuit board materials, semiconductors, electrooptic crystals, etc. The method of the invention is self-aligning, due to lithographically defined registration between the alignment stop and the waveguide access of the end-face. Also, a flexible substrate between the two rigidly fixed ends of the waveguide permits tolerance to misalignment between the ends. This may be critically important in systems subjected to very wide temperature variations. The optical waveguide and its substrate are transparent and can thus be readily inspected, even though the waveguide is underneath its flexible substrate.

BRIEF DESCRIPTION OF THE DRAWINGS

FIGS. 1a and 1b are an illustration of a flexible optical coupler between an optical waveguide to a specific case of a surface-coupled opto-electronic integrated circuit chip.

DESCRIPTION OF THE PREFERRED EMBODIMENTS

Figure 2A:
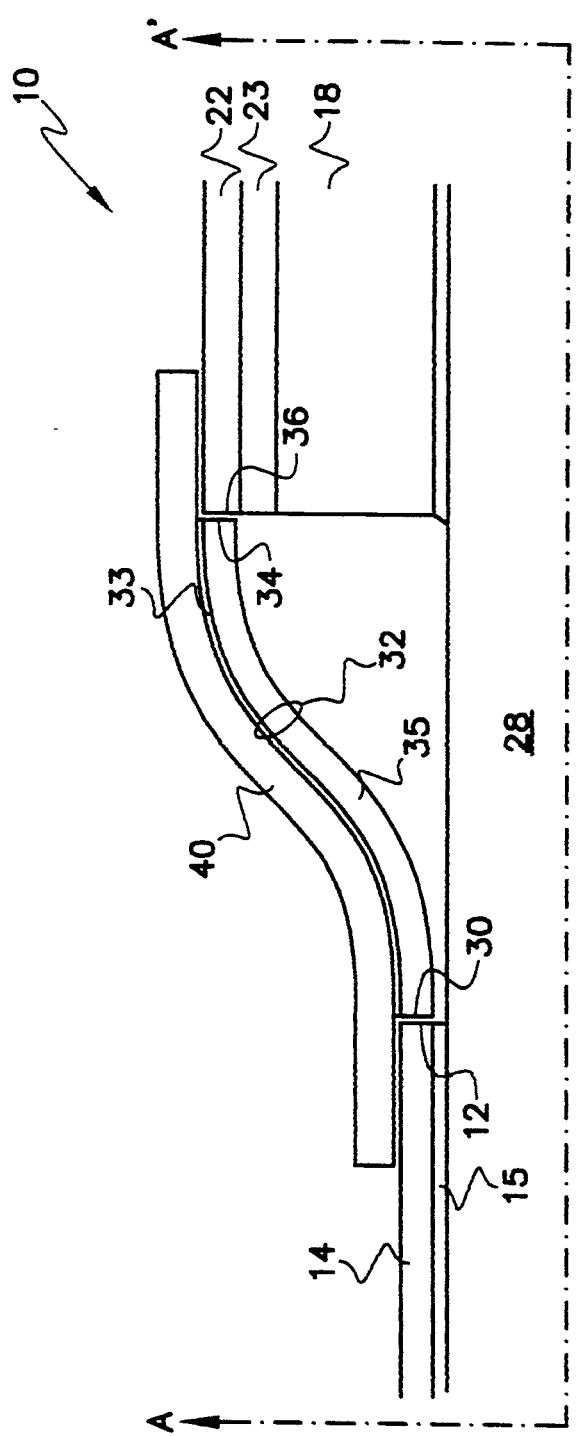
FIGS. 2a, b and c show the side, assembled top, and disassembled top views, respectively, of a flexible optical coupler with the preferred form of the alignment stops.

FIG. 1a illustrates the coupling of an input or output port or end-face 12 of a polyimide optical channel waveguide 14 to an optical output or input port 16 on an electronic, opto-electronic, or photonic integrated circuit chip 18, often herein referred to as chip 18. Coupling arrangement 10 pertains to both waveguide input coupling (e.g., integrated circuit to waveguide) and waveguide output coupling (e.g., waveguide to integrated circuit). Coupling 10 may be used for multimode waveguides which are often used for optical interconnection applications because of increased tolerance to misalignment and higher coupling efficiency than that for single mode waveguides. However, coupling configuration 10 may be used for coupling single mode waveguides despite the increased alignment precision required for single mode channels in contrast to multimode channels. FIG. 1b shows an end section of waveguide 14, clad 15 and board or substrate 28.

FIG. 1a reveals the optical channel surface waveguide 14 access to emphasize the accessibility of channel waveguide 14 at surface 12. However, channel waveguide 14 may be buried by using a low-index overlayer film to provide improved ruggedness and reduced performance degradation due to handling and environmental conditions. Likewise, optical port 16 on integrated circuit 18 may be buried when optical port 16 is in the form of an optical waveguide. The situation of surface-coupling on an electronic integrated circuit chip is noted below.

The emphasis of coupling arrangement 10 is on optical channel waveguide 14 formed with polymeric materials, such as the polyimides. Polyimide-based optical waveguides have core thicknesses which range from a couple micrometers to about 50 micrometers according to the refractive indices, wavelength, and the desired number of waveguide modes. The lower waveguide clad 15 immediately below the waveguide core has a thickness in the range of 2 to 8 micrometers. If the waveguide core is buried using a low-index overlayer film, the resulting upper waveguide clad 33 (in FIG. 2a) has a thickness in the range of 2 to 8 micrometers. The lower and upper cladding thicknesses depend on the cladding refractive index and the degree of optical isolation required between the waveguide and the waveguide substrate and the waveguide and the waveguide superstrate, respectively.

Optical channel waveguides are made using plasma etch processes to delineate the channel as well as direct-write processes on photosensitive polyimides. These processes are known to those skilled in the art. (For example, see a relevant overview in "Polymeric Waveguides," by C. T. Sullivan, on pp. 27–31, in *IEEE Circuits and Devices*, January 1992; and in "Optical Waveguide Circuits for Printed Wire-Board Interconnections," by C. T. Sullivan, on pp 92–100, in Proc. SPIE 944, 1988.)

FIG. 2a shows a cross section of the side view of a coupling layout 10. Surface channel waveguide 14 is representative of the raised channel polyimide waveguide as well as an inverted version in the form of coupling configuration 10 itself which connects waveguide 14 to waveguide 22 on integrated circuit 18.

Figure 2B:
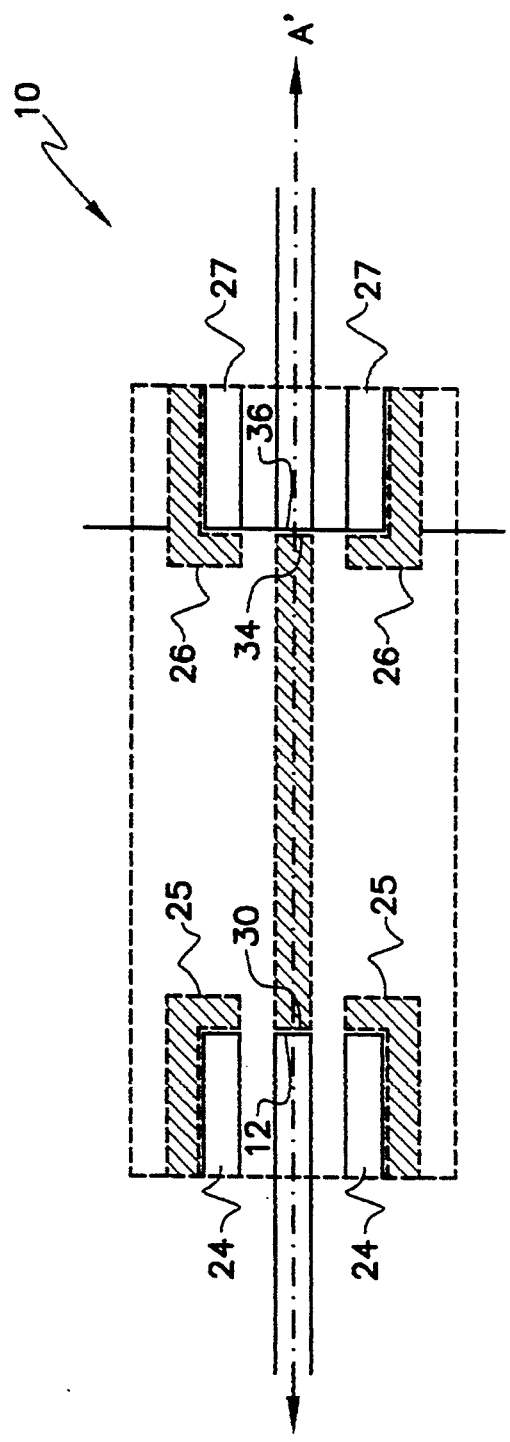
Figure 2C:
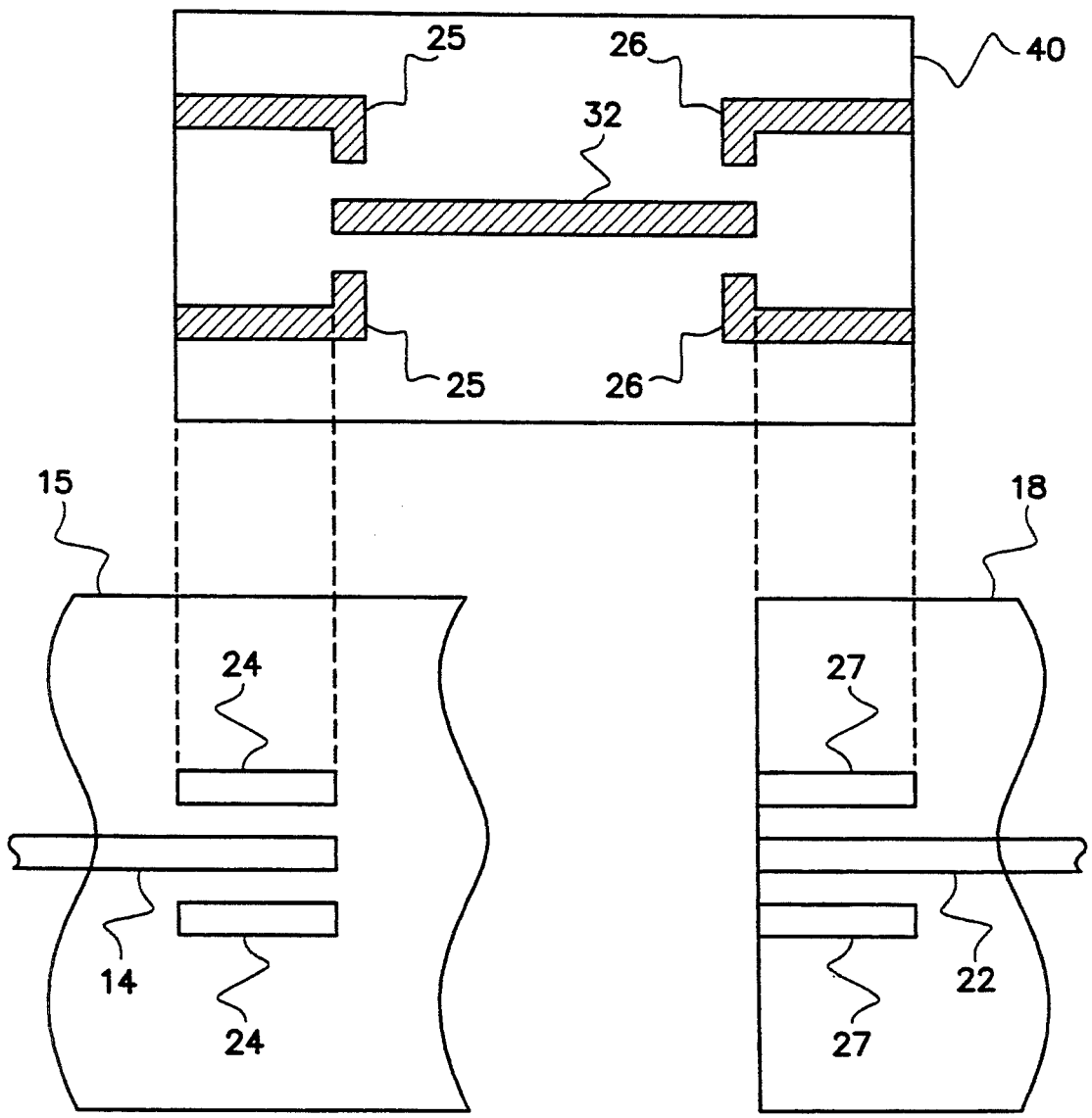

In either the direct write or the etched channel fabrication approach, alignment stops 24 and 25 provide lateral and longitudinal alignment between ports 12 and 30, and alignment stops 26 and 27 provide lateral and longitudinal alignment between ports 34 and 36. Alignment stops 24 shown in FIG. 2b can easily be formed in the same process as delineating the optical channel waveguide 14, or in sequential process steps, as can alignment stops 25 and 26 and waveguide 35. The channel waveguide 32 thickness typically used for rectangular polyimide channel waveguides is sufficiently thick and sturdy to be used as well as an alignment stop mechanism 25 and 26. The same is true of waveguide 14 and alignment stops 24, and waveguide 22 and alignment stops 27. This single-step process is preferred due to fabrication simplicity and improved alignment precision. Alignment stops 24, end face 12 and waveguide 14 are essentially on printed circuit board or chip substrate 28. Optical waveguide ports 30 and 34 and alignment stops 25 and 26 are on flexible optical coupler carrier 40, as can be noted in FIG. 2c. This particular design is exemplary only. In either case, the registration of the alignment stops 24 to the waveguide end face 12 can be very precise as it is limited by mask writing precision (approximately 100 nanometer precision) or inter-mask registration (approximately 200 nanometer precision), respectively, depending on whether a single-step or sequential process steps are used. The same is true for alignment stops 25 and waveguide endface 30 on the flexible optical coupler 32. The purpose of the alignment stops 24, 25, 26 and 27 is to align precisely the optical waveguide port 12 on the chip carrier or board 28 to optical waveguide port 30 on coupler 32, and optical waveguide port 34 on the opposite end of the coupler 32 to optical port 36 on chip 18. Waveguide 22 of chip 18 has a waveguide port 36. Alignment mechanisms 27 and 26 provide lateral and longitudinal alignment between coupler 32 and waveguide 22. Waveguide 32 itself is flexible, so it can accommodate reasonable alignment differences between the surface normals to waveguide ports 12, 30, 34, and 36 on chip carrier 28 and on chip 18, respectively. Clad 15, 23 and 33 provide structural support and optical isolation for waveguides 14, 22 and 35, respectively. The limit of curvature for coupler 32 is related both to short-term optical bending loss and longer-term optical, mechanical and thermal considerations, including strain-induced birefringence, micro-cracking and polymeric orientation. Obviously, degradation and failure can be avoided by prudent design, particularly by minimizing stresses on coupler 32. The present approach does not preclude the use of additional layers on coupler carrier 40, which provide enhanced stability, longer lifetime, tolerance to thermal shock and cycling, and reduced effects of humidity.

Figure 3A:
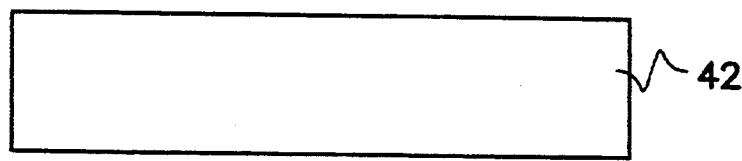
FIGS. 3a, b, c and d illustrate a fabrication sequence of the flexible optical coupler.
Figure 3B:
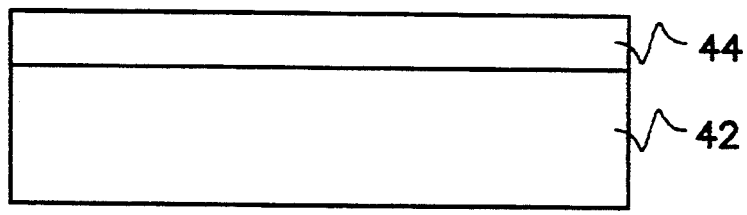
Figure 3C:
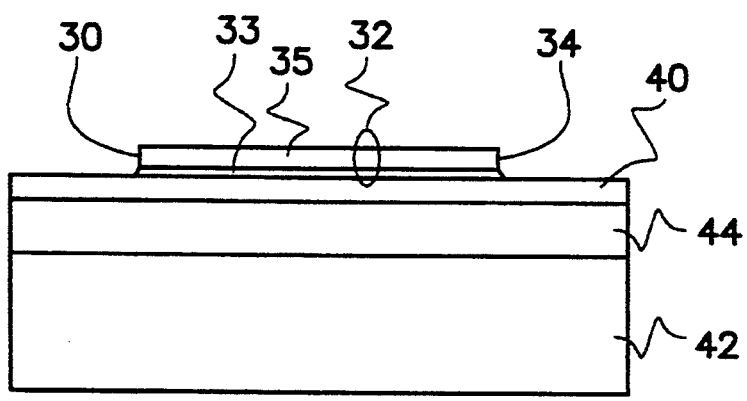
Figure 3D:
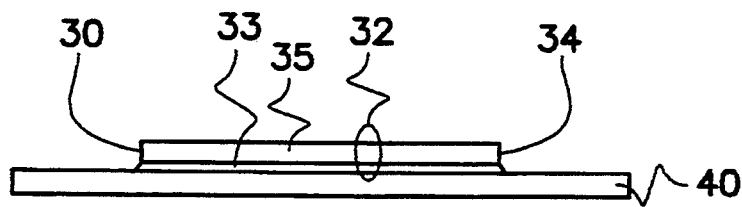

FIGS. 3a–d illustrate how coupler 32 may be fabricated. First, in FIG. 3a, a suitable temporary substrate 42 with appropriate features (dimensions, thermal coefficient of expansion and process compatibility) is coated with a suitable sacrificial lift-off layer 44 in the form of a thin film, as indicated in FIG. 3b. An example of such a coated substrate is silicon dioxide that has been plasma-deposited on silicon; however, this is not restrictive. Multi-layer polymeric thin-film deposition, solvent removal or curing, and a photolithographic and etching processes are then carried out to form optical coupler 32 having core 35, clad 33, carrier 40, and end faces 30 and 34, and alignment stops 25 and 26 on coupler 32, as well as any other features of importance in the coupler (e.g., stiffener), as illustrated in FIG. 3c. It is apparent that if substrate 42 is a standard silicon wafer, standard lithographic fine-line processes may be easily used to provide the same benefits associated with electronic integration (such as batch processing and high yield). Liftoff layer 44 is then dissolved to detach the processed multi-layer polymeric waveguide structure 32, including carrier 40, from its temporary substrate 42, as illustrated in FIGS. 3c and 3d. Remaining structure of coupler 32 and carrier 40 can then be attached between optical ports 12 and 36, and serve as optical signal coupler 32. With appropriately chosen materials and processes, completed coupler 32 is optically transparent (particularly in the near infrared), so coarse alignment can be obtained visually, and coupler 32 can be inspected after assembly and during testing.

Figure 4:
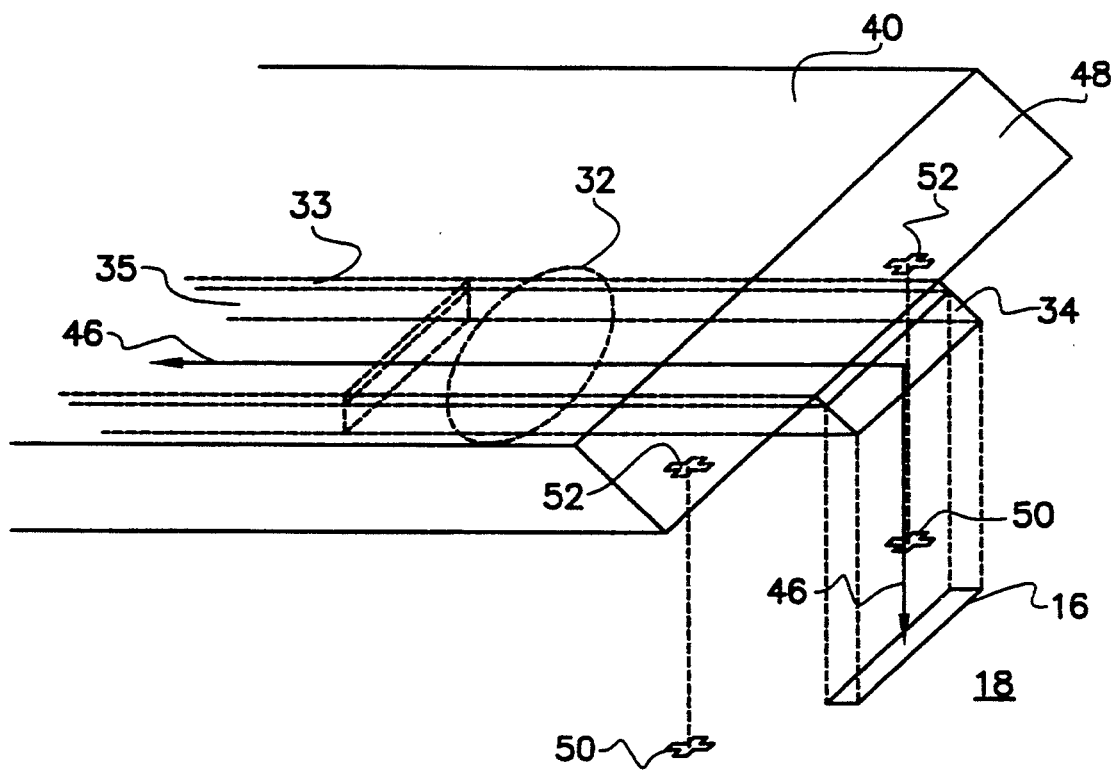
FIG. 4 reveals an alternative approach for a coupling which provides out-of-plane light deflection.

FIG. 4 shows an alternative technique that can be used at either end of coupler 32 to permit out-of-plane light deflection, such as needed at an end attached to a surface-coupled photodetector 16. Before the liftoff step shown in FIGS. 3c–3d, the composite structure of FIG. 3c can be mounted on a polishing block and then the waveguide 32 end lapped and polished at an appropriate angle with respect to the waveguide axis 46.

Alternative processes, such as plasma etching, laser ablation, microtoming, or precision sawing may be used in lieu of lapping and polishing. These techniques may be more cost-effective depending on the material constituting structure 40. The angle of 45 degrees of port 34 shown in FIG. 4 may be desirable for simplicity, but may have too low of a return loss (i.e., too high of a return signal); a more desirable angle may be in the range of 50–60 degrees relative to the plane of surface detector or emitter 16 to ensure that Fresnel reflections from port 16 are not recoupled into waveguide 32.

Figure 5A:
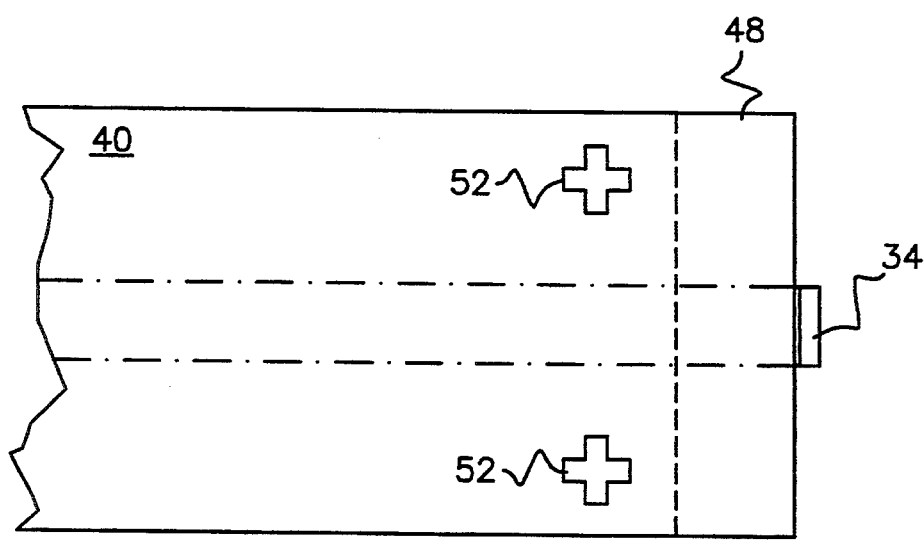
FIG. 5 shows a coupler end and an integrated circuit, having out-of-plane light deflection, with registration marks for coupling alignment.
Figure 5B:
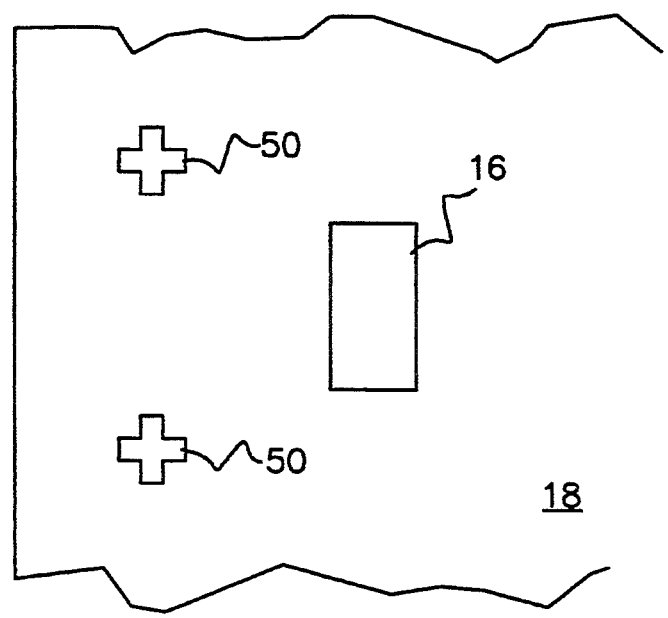

After polishing surfaces 34 and 48 of coupler 32 and carrier 40, respectively, it is generally necessary to deposit a layer of material on the planar surface encompassing surfaces 34 and 48 in FIG. 4 to render it reflective. The layer of deposited material may be in the form of a layer of titanium and gold or other metal, or perhaps in the form of a multi-layer stack of dielectrics in such a way to implement efficient reflection of light signal 46 from channel waveguide 32 to port 16 of the chip 18 surface. In FIGS. 4 and 5, registration marks 50 and 52 on integrated circuit 18 and coupler carrier 40, respectively, are used as means for aligning surface 34 on carrier 40 to port 16 on chip 18 in the absence of alignment stops such as 27 in FIGS. 2a, 2b and 2c. This kind of stops is used on the circuit 18 end of carrier 40 in FIG. 1a.

I claim:

1. A self-aligning flexible optical coupler comprising:
 a flexible carrier having first and second ends;
 a flexible rectangular polymeric channel optical waveguide, attached to said carrier, having first and second ends;
 a flexible clad adhered to said optical waveguide, for providing optical isolation for the waveguide;
 a first set of alignment stops attached to the first end of said carrier;
 a second set of alignment stops attached to the second end of said carrier;
 a first optical port at the first end of said waveguide; and
 a second optical port at the second end of said waveguide; and wherein:
 said optical coupler is capable of conveying light signals from a first device to a second device;
 the first device has a third optical port;
 the third optical port has a third set of alignment stops that match the first set of alignment stops for aligning the first optical port with the third optical port;
 the second device has a fourth optical port; and
 the fourth optical port has a fourth set of alignment stops for aligning the second optical port with the fourth optical port.

2. A self-aligning flexible optical coupler for optically connecting first and second devices comprising:
 an optical waveguide having first and second optical ports;
 an optical cladding adhered to said optical waveguide;
 a carrier adhered to said cladding, for supporting said optical waveguide, having first and second ends proximate to the first and second ports, respectively;
 a first registration mark at the first end of said carrier; and
 a second registration mark at the second end of said carrier; and
wherein:
 the first device has an optical port and a registration mark proximate to the optical port;
 the second device has an optical port and a registration mark proximate to the optical port;
 for optical alignment and connection of the first port to the port of the first device, the first registration mark is aligned with the registration mark of the first device; and
 for optical alignment and connection of the second port to the port of the second device, the second registration mark is aligned with the registration mark of the second device.

3. The coupler of claim 2 wherein at least one port of the first and second ports has a bevelled reflective surface for reflecting coupled light at the port of the first or second device.

* * * * *